(12) United States Patent
Pruitt

(10) Patent No.: US 11,603,864 B2
(45) Date of Patent: Mar. 14, 2023

(54) RECIRCULATION NOISE OBSTRUCTION FOR A TURBOCHARGER

(71) Applicant: BorgWarner Inc., Auburn Hills, MI (US)

(72) Inventor: Daniel Pruitt, Boiling Springs, SC (US)

(73) Assignee: BorgWarner Inc., Auburn Hills, MI (US)

( * ) Notice: Subject to any disclaimer, the term of this patent is extended or adjusted under 35 U.S.C. 154(b) by 143 days.

(21) Appl. No.: 15/306,563

(22) PCT Filed: Apr. 30, 2015

(86) PCT No.: PCT/US2015/028487
§ 371 (c)(1),
(2) Date: Oct. 25, 2016

(87) PCT Pub. No.: WO2015/175234
PCT Pub. Date: Nov. 19, 2015

(65) Prior Publication Data
US 2017/0051761 A1    Feb. 23, 2017

Related U.S. Application Data

(60) Provisional application No. 61/992,664, filed on May 13, 2014.

(51) Int. Cl.
*F04D 29/66* (2006.01)
*F04D 29/68* (2006.01)
(Continued)

(52) U.S. Cl.
CPC ........... *F04D 29/667* (2013.01); *F02B 33/40* (2013.01); *F02B 37/16* (2013.01);
(Continued)

(58) Field of Classification Search
CPC ........ F01D 25/04; F04D 29/66; F04D 29/663; F04D 29/667; F04D 29/685
(Continued)

(56) References Cited

U.S. PATENT DOCUMENTS 5,246,335 A * 9/1993 Mitsubori ........... F04D 29/4213
  415/214.1
5,295,785 A * 3/1994 Church ............... F04D 29/4213
  415/119
(Continued)

FOREIGN PATENT DOCUMENTS

DE    19727139    *  1/1999    ............. F04D 29/42
DE    19727139 A1    1/1999
(Continued)

OTHER PUBLICATIONS

DE 19727139, Sumser et al., Jan. 1999, English Translation Copy (Year: 1999).*
(Continued)

*Primary Examiner* — David E Sosnowski
*Assistant Examiner* — Aye S Htay
(74) *Attorney, Agent, or Firm* — Eric L. Doyle; Stephan A. Pendorf; Patent Central LLC

(57) ABSTRACT

A compressor housing (12) for a turbocharger includes a recirculation cavity (4) formed in a portion of the compressor housing (12). The recirculation cavity (4) is defined by an inner cavity wall (2) and an outer cavity wall (5). In addition, an inlet groove (1) and an outlet (7) are formed in the recirculation cavity (4) for circulating airflow from the compressor housing (12) through the recirculation cavity (4), and at least one recirculation noise obstruction (6) is fixedly secured within the recirculation cavity (4) to disrupt air flow through the cavity and reduce noise in the compressor housing (12).

11 Claims, 3 Drawing Sheets

(51) Int. Cl.
  *F02B 37/16* (2006.01)
  *F04D 29/42* (2006.01)
  *F02B 33/40* (2006.01)

(52) U.S. Cl.
  CPC ..... *F04D 29/4206* (2013.01); *F04D 29/4213* (2013.01); *F04D 29/663* (2013.01); *F04D 29/685* (2013.01); *F05D 2220/40* (2013.01); *F05D 2270/101* (2013.01); *Y02T 10/12* (2013.01)

(58) Field of Classification Search
  USPC ........................................................ 415/119
  See application file for complete search history.

(56) References Cited

U.S. PATENT DOCUMENTS

| | | | | |
|---|---|---|---|---|
| 6,623,239 B2* | 9/2003 | Sahay | ..................... | F02B 37/16 |
| | | | | 415/11 |
| 2002/0071765 A1 | 6/2002 | Sahay et al. | | |
| 2009/0214334 A1* | 8/2009 | Fukami | ............... | F04D 29/4213 |
| | | | | 415/206 |
| 2010/0172741 A1* | 7/2010 | Hosoya | ............... | F04D 29/4213 |
| | | | | 415/119 |
| 2011/0085902 A1* | 4/2011 | Yin | ....................... | F04D 29/685 |
| | | | | 415/208.2 |

FOREIGN PATENT DOCUMENTS

| | | |
|---|---|---|
| EP | 2194279 A1 | 6/2010 |
| WO | 2006090152 A1 | 8/2006 |
| WO | 2013191937 A1 | 12/2013 |

OTHER PUBLICATIONS

International Search Report and Written Opinion in International Application No. PCT/US2015/039913, dated Oct. 15, 2015.

\* cited by examiner

RECIRCULATION NOISE OBSTRUCTION FOR A TURBOCHARGER

CROSS-REFERENCE TO RELATED APPLICATIONS

This application claims priority to and all the benefits of U.S. Provisional Application No. 61/992,664, filed on May 13, 2014, and entitled "Recirculation Noise Obstruction For A Turbocharger," which is incorporated herein by reference.

BACKGROUND OF THE INVENTION

1. Field of the Invention

The present invention relates to a recirculation noise obstruction for a turbocharger. More particularly, the present invention relates to a recirculation noise obstruction in a recirculation cavity formed in a compressor housing of a turbocharger to reduce airflow noise within the compressor.

2. Description of Related Art

By way of background, turbochargers deliver compressed air to an engine intake, allowing more fuel to be combusted, thus boosting an engine's horsepower without significantly increasing engine weight. Turbochargers typically include a turbine housing connected to the engine's exhaust manifold, a center bearing housing, and a compressor housing connected to the engine's intake manifold. A turbine wheel in the turbine housing is rotatably driven by an inflow of exhaust gas supplied from the exhaust manifold. A shaft is rotatably supported in the center bearing housing connects the turbine wheel to a compressor impeller in the compressor housing so that rotation of the turbine wheel causes rotation of the compressor impeller. As the compressor impeller rotates, it increases the air mass flow rate, airflow density and air pressure delivered to the engine's cylinders via the engine's intake manifold.

It is commonly known to form a recirculation cavity in the compressor housing to recirculate airflow into the compressor and improve turbocharger performance. During various operating conditions of the turbocharger, air will flow through the recirculation cavity, however, when this occurs there is a potential for noise to be generated.

Therefore, it is desirable to provide an obstruction within the recirculation cavity to disrupt airflow and reduce or eliminate noise.

SUMMARY OF THE INVENTION

According to one aspect of the invention, a compressor housing for a turbocharger is provided having a recirculation cavity formed in a portion of the compressor housing. The recirculation cavity is defined by an inner cavity wall and an outer cavity wall. Airflow through the compressor housing passes through the recirculation cavity between an inlet slot and an outlet. At least one recirculation noise obstruction is fixedly secured within the recirculation cavity to disrupt air flow through the cavity and reduce noise in the compressor housing.

The compressor housing may include one or more of the following features: The compressor housing further includes a compressor air inlet configured to supply air to a compressor wheel disposed in the compressor housing, and the inlet slot communicates with the compressor air inlet at a location downstream of the outlet slot, where the term "downstream" refers to a location relative to a direction of airflow through the compressor air inlet. In addition, the at least one recirculation noise obstruction is secured within the recirculation cavity at a location such that the inlet slot is disposed between the at least one recirculation noise obstruction and the outlet slot. The inner cavity wall is supported relative to the outer cavity wall via a strut. The at least one recirculation noise obstruction extends within the recirculation cavity at an angle relative to an axis defined by the strut. The at least one recirculation noise obstruction extends through the recirculation cavity between the inner cavity wall and outer cavity wall. The at least one recirculation noise obstruction extends only partially through the recirculation cavity. The at least one recirculation noise obstruction extends in a cantilevered manner from one of the inner cavity wall and the outer cavity wall. The at least one recirculation noise obstruction extends between spaced-apart locations of the outer cavity wall.

BRIEF DESCRIPTION OF THE DRAWINGS

The invention will be readily appreciated as the same becomes better understood by reference to the following detailed description when considered in connection with the accompanying drawings wherein.

DETAILED DESCRIPTION OF THE EMBODIMENTS

Figure 1:
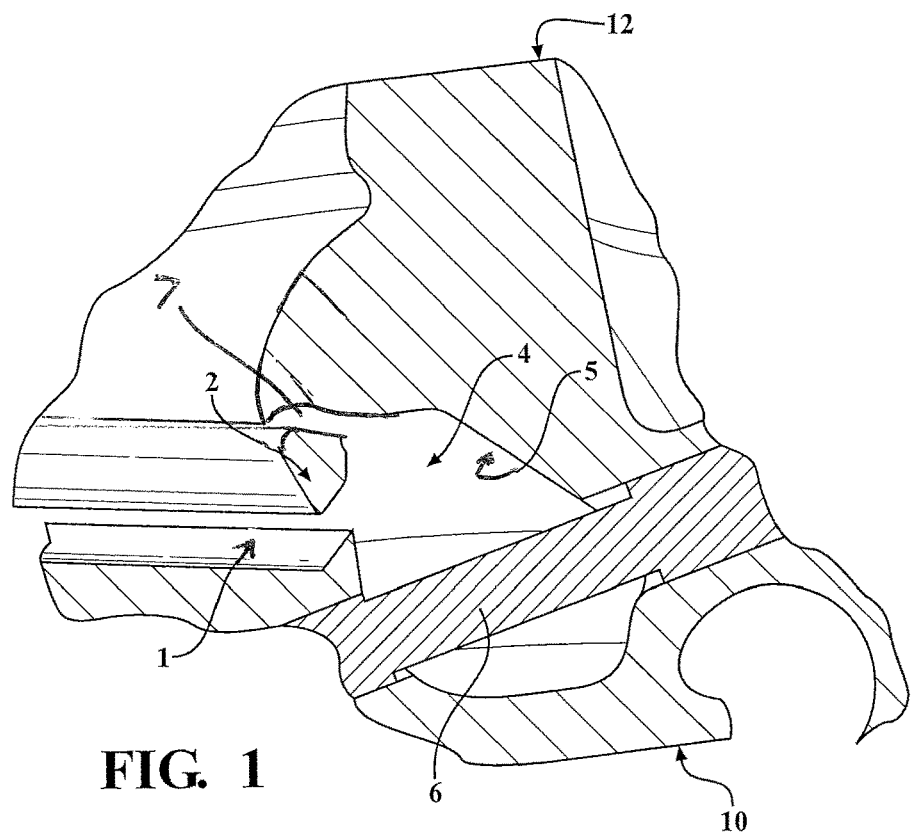
FIG. 1 is a fragmentary cross-sectional side view of a recirculation noise obstruction inserted into the recirculation cavity of the compressor housing according to one embodiment of the invention.
Figure 2:
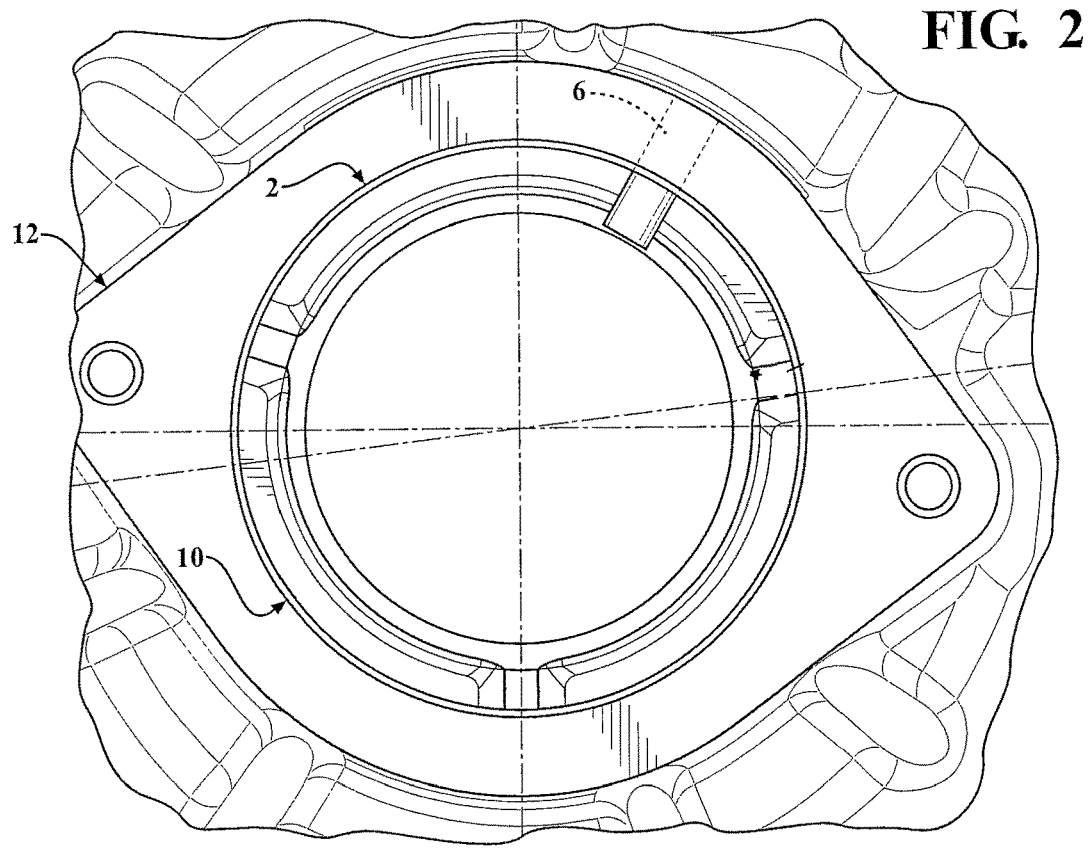
FIG. 2 is a top view of the recirculation noise obstruction of FIG. 1.

The present invention relates to a recirculation noise obstruction for use in a turbocharger. A turbocharger typically comprises a turbine housing connected to an engine's exhaust manifold, a center bearing housing, and a compressor housing connected to the engine's intake manifold. A turbine wheel in the turbine housing is rotatably driven by an inflow of exhaust gas supplied from the exhaust manifold. A shaft is radially supported in the center bearing housing and interconnects the turbine wheel to a compressor impeller in the compressor housing so that rotation of the turbine wheel causes rotation of the compressor impeller. As the compressor impeller rotates, it increases the air mass flow rate, airflow density and air pressure delivered to the engine's cylinders via the engine's intake manifold.

Referring to Figures, an inlet portion 10 of a compressor housing 12 is generally shown for rotatably housing a compressor wheel 14. A recirculation cavity 4 is formed in the compressor housing 12 between an inlet, or recirculation slot 1, and an outlet slot 7 to recirculate airflow in the compressor housing 12 into the inlet portion 10 thereof as shown by the exemplary airflow arrow at A in FIGS. 3 and 4. The recirculation cavity 4 is defined between an inner recirculation cavity wall 2 and an outer recirculation cavity wall 5. A support strut 3 extends between the inner cavity wall 2 and the outer cavity wall 5 for supporting the inner cavity wall 2.

During normal and various operating conditions of the turbocharger, air will flow through the recirculation cavity 4 in the direction of the airflow arrow A. However, there is the potential for noise to be generated by the air flowing through the cavity 4. The present invention relates to a recirculation noise obstruction 6 inserted, seated, or formed in a portion of the recirculation cavity 4 to disrupt the airflow and reduce or eliminate the noise.

The recirculation noise obstruction 6 comprises material which may be cast or inserted into the recirculation cavity 4 to reduce or eliminate noise by disrupting the air flow through the cavity 4 within certain regions thereof.

Figure 3:
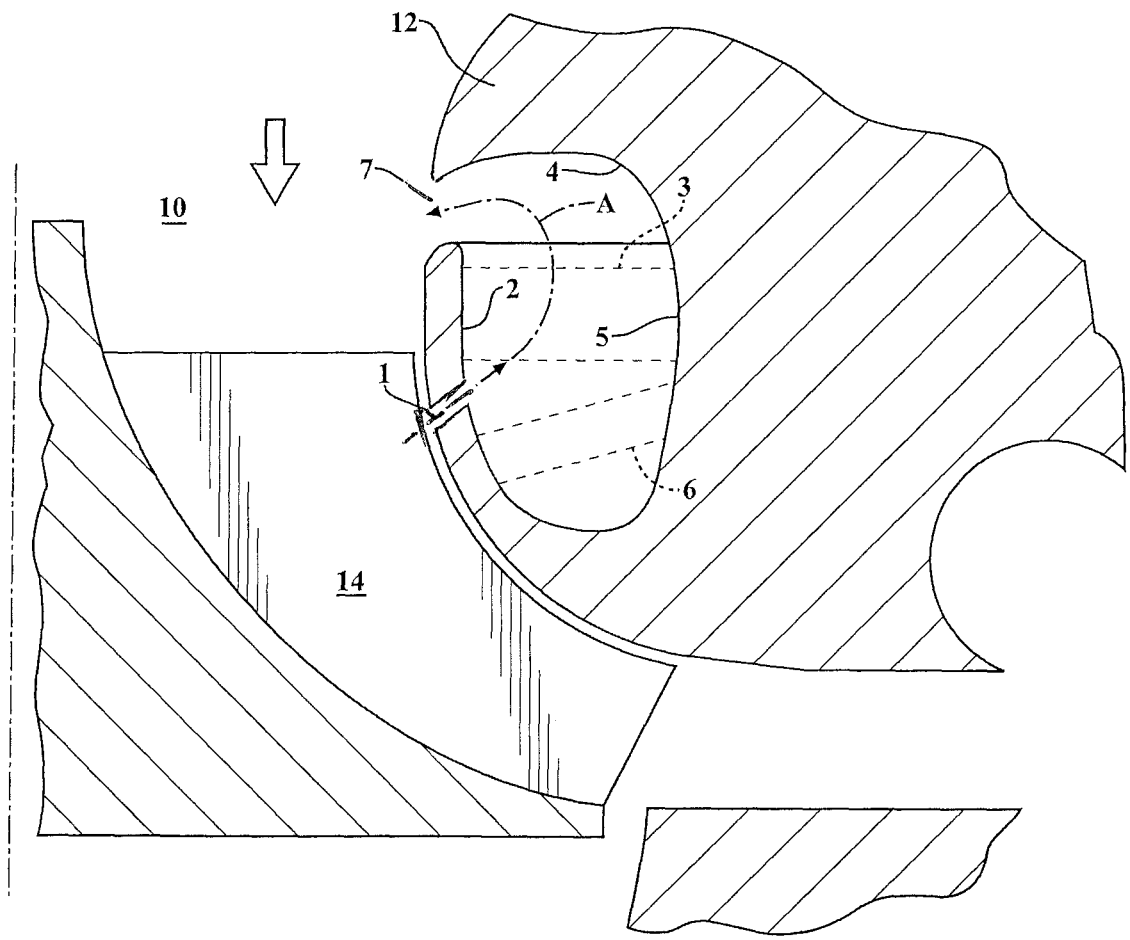
FIG. 3 is a cross-sectional side view of a compressor housing and compressor wheel with a recirculation noise obstruction seated in the recirculation cavity of the compressor housing.
Figure 4:
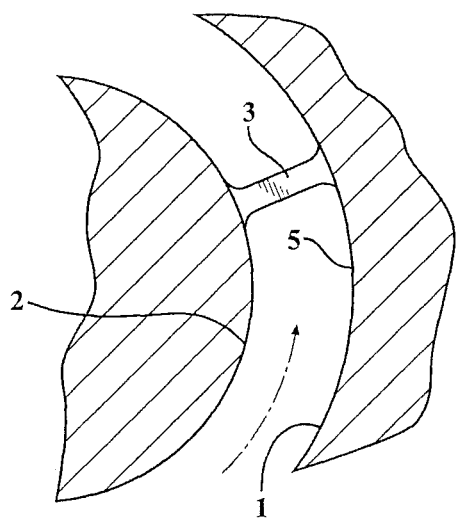
FIG. 4 is a fragmentary top view of the inlet of the compressor housing.

FIGS. 1 and 3 show the recirculation noise obstruction 6 extending through the cavity 4 between the inner cavity wall 2 and outer cavity wall 5 at an angle in the lower portion of the cavity 4 below the strut 3 and also below the recirculation slot or inlet 1. However, it should be appreciated that the obstruction 6 may be seated in different portions of the cavity 4 and at different angles between the inner wall 2 and outer wall 5. That is, the obstruction may be located at any radial and/or angular position within the cavity in relation to the strut 3.

Figure 5:
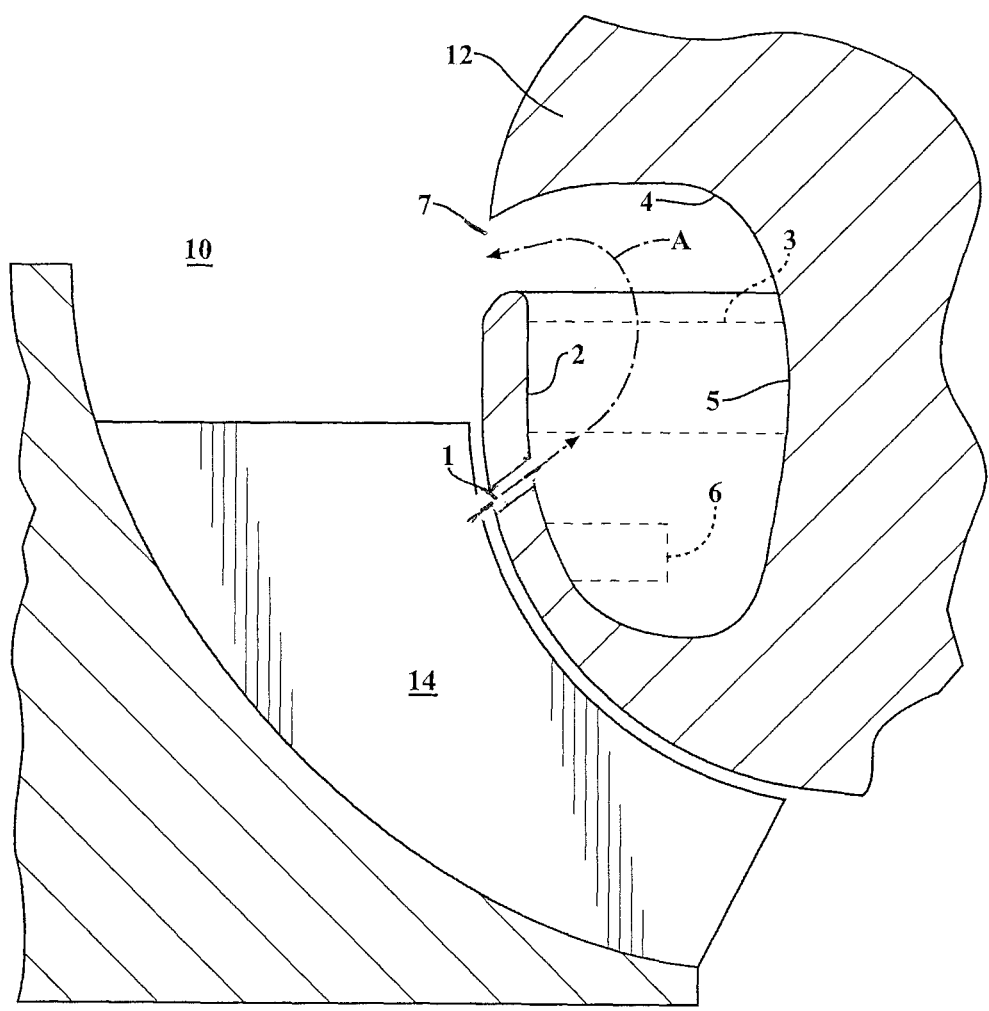
FIG. 5 is a cross-section side view of the compressor housing and wheel with a recirculation noise obstruction in the recirculation cavity according to an alternative embodiment of the invention.

Additionally, referring to FIG. 5, the obstruction 6 may also extend partially into the cavity 4 from either the inner wall 2 or the outer wall 5 in a cantilevered manner to a distal end. Further, the number of obstructions 6 within the cavity 4 may include one or more obstructions 6 extending from either the inner wall 2 or outer wall 5 or between the inner and outer walls 2, 5. The obstructions 6 may comprise any shape, for example, rectangular, cylindrical, teardrop, tapered, or the like, as desired based on noise reduction and other requirement for a specific result or application.

Finally, the obstruction 6 may comprise any type of material, but preferable will comprise material similar to that of the compressor housing 12. The obstruction 6 may be cast, screwed, pressed, adhered, or any other insertion option as needed to fixedly secure the obstruction 6 within the cavity 4.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A compressor for a turbocharger comprising:
a compressor wheel (14),
compressor housing (12) with a recirculation cavity (4) formed in a portion of the compressor housing (12), the recirculation cavity (4) defined by an inner cavity wall (2) and an outer cavity wall (5), the inner cavity wall adapted for housing the compressor wheel;
a recirculation inlet slot (1) axially adjacent the compressor wheel and a recirculation outlet slot (7) upstream of the compressor wheel, the recirculation inlet slot (1) and recirculation outlet slot (7) formed in the inner cavity wall (2) of the recirculation cavity (4) for circulating compressed airflow from the compressor wheel via the recirculation inlet slot (1) through the recirculation cavity (4) to the recirculation outlet slot (7); and at least one recirculation noise obstruction (6) having a first end and a second end and extending between the inner cavity wall (2) and the outer cavity wall (5) with the first end connected to the inner cavity wall (2) and the second end connected to the outer cavity wall (5) and fixedly secured within the recirculation cavity (4) to disrupt the airflow through the recirculation cavity (4) and reduce noise in the compressor housing (12),
wherein the at least one recirculation noise obstruction (6) in its entirety is secured within the recirculation cavity (4) at a location such that the recirculation inlet slot (1) is disposed between each of the at least one recirculation noise obstruction (6) in its entirety and the recirculation outlet slot (7).

2. The compressor of claim 1, wherein the inner cavity wall (2) is supported relative to the outer cavity wall (5) via a strut (3).

3. The compressor of claim 2, wherein the at least one recirculation noise obstruction (6) extends within the recirculation cavity (4) at an angle relative to an axis defined by the strut (3).

4. The compressor of claim 1, wherein each of the at least one recirculation noise obstruction (6) extends through the recirculation cavity (4) between the inner cavity wall (2) and outer cavity wall (5).

5. The compressor of claim 1, wherein the at least one recirculation noise obstruction (6) comprises a circular cross-sectional profile.

6. The compressor of claim 1, further comprising at least one strut (3) disposed in the recirculation cavity (4) and attached to the outer cavity wall (5) and a portion of the inner cavity wall (2) between the inlet slot (1) and the outlet slot (7).

7. The compressor of claim 1, wherein the at least one recirculation noise obstruction (6) is one recirculation noise obstruction (6).

8. A compressor for a turbocharger comprising a compressor wheel (14), and compressor housing (12), the compressor housing (12) comprising
a compressor air inlet portion (10) configured to supply air to the compressor wheel (14) disposed in the compressor housing (12),
a recirculation cavity (4) formed in a portion of the compressor housing (12), the recirculation cavity (4) defined by an inner cavity wall (2), an outer cavity wall (5), a recirculation inlet slot (1) axially adjacent the compressor wheel and a recirculation outlet slot (7) upstream of the compressor wheel, the recirculation inlet slot (1) and recirculation outlet slot (7) formed in the inner cavity wall (2) of the recirculation cavity (4) for circulating compressed airflow from the compressor wheel via the recirculation inlet slot (1) through the recirculation cavity (4) to the recirculation outlet slot (7), and at least one recirculation noise obstruction (6) having a first end and a second end and extending between the inner cavity wall (2) and the outer cavity wall (5) with the first end connected to the inner cavity wall (2) and the second end connected to the outer cavity wall (5) and fixedly secured within the recirculation cavity (4) to disrupt the airflow through the recirculation cavity (4) and reduce noise in the compressor housing (12),
wherein the at least one recirculation noise obstruction (6) in its entirety is secured within the recirculation cavity (4) at a location such that the recirculation inlet slot (1)

is disposed between each of the at least one recirculation noise obstruction (6) in its entirety and the recirculation outlet slot (7).

9. The compressor of claim 8, wherein the at least one recirculation noise obstruction (6) comprises a circular cross-sectional profile.

10. The compressor of claim 8, wherein the at least one recirculation noise obstruction (6) is one recirculation noise obstruction (6).

11. A compressor for a turbocharger comprising:
a compressor wheel (14), and
a compressor housing (12) with a compressor air inlet portion (10) configured to supply air to the compressor wheel (14) disposed in the compressor housing (12), with a recirculation cavity (4) formed in a portion of the compressor housing (12), the recirculation cavity (4) defined by an inner cavity wall (2) and an outer cavity wall (5), the inner cavity wall adapted for housing the compressor wheel, the recirculation cavity (4) including a recirculation inlet slot (1) downstream of the compressor wheel most upstream blade edges and a recirculation outlet slot (7) upstream of the compressor wheel, the inlet slot (1) and outlet slot (7) formed in the inner cavity wall (2) of the recirculation cavity (4) for circulating compressed airflow from the inlet slot (1) through the recirculation cavity (4) to the outlet slot (7), and at least one recirculation noise obstruction (6) having a first end and a second end and extending between the inner cavity wall (2) and the outer cavity wall (5) with the first end connected to the inner cavity wall (2) and the second end connected to the outer cavity wall (5) and fixedly secured within the recirculation cavity (4) to disrupt the airflow through the recirculation cavity (4) and reduce noise in the compressor housing (12),
wherein the at least one recirculation noise obstruction (6) in its entirety is secured within the recirculation cavity (4) at a location such that the recirculation inlet slot (1) is disposed between each of the at least one recirculation noise obstruction (6) in its entirety and the recirculation outlet slot (7).

* * * * *